INVENTOR.
JOHN J. TAYLOR
ATTORNEY

Aug. 2, 1966 J. J. TAYLOR 3,264,400
SUPPRESSORS FOR TRANSMISSION LINE CONDUCTORS
Filed Oct. 28, 1963 2 Sheets-Sheet 2

INVENTOR.
JOHN J. TAYLOR
BY
ATTORNEY

United States Patent Office 3,264,400
Patented August 2, 1966

3,264,400
SUPPRESSORS FOR TRANSMISSION LINE CONDUCTORS
John J. Taylor, Medina, Ohio, assignor to The Ohio Brass Company, Mansfield, Ohio, a corporation of New Jersey
Filed Oct. 28, 1963, Ser. No. 319,186
8 Claims. (Cl. 174—42)

This patent relates to transmission lines and transmission line conductors and, more particularly, to apparatus for damping vibrations in line conductors.

A principal object of the invention is to stabilize transmission line conductors.

Another object of the invention is to limit periodic movement of suspended transmission line conductors in the longitudinal direction of the conductor cable.

Still another object of the invention is to eliminate conductor and insulator damage due to uncontrolled vibrations in transmission line conductors.

It is known that under certain conditions of icing, loading, wind velocity, and the like, suspended cables in overhead transmission lines are excited into violent transverse vibrations which may grow in intensity so that the line is ultimately destroyed. Under certain circumstances the transverse vibrations generate waves which travel along the cable and are reflected at the suspension points, often with great damage to the suspension apparatus.

The present invention relates to means for damping or dissipating the energy of such traveling waves. Particularly, it is contemplated that a dissipation of the forces involved during early stages of the growth of the wave will suppress the vibrations and resulting waves, or at least prevent growth thereof to destructive levels.

The apparatus of the invention contemplates the use of fluid dampers for dissipating energy in the cable at suspension points, e.g. at towers or other supporting structures. The conductor cable is carried from the tower by means of suspension insulators and conductor clamps or like apparatus. The dampers are positioned and held against movement by strut insulators which are attached to the tower and extend to a position adjacent the conductor at the suspension insulator. Various structures and configurations of support means and fluid dampers are contemplated in accordance with the invention.

It is a feature of the invention that the various embodiments of the apparatus thereof may be utilized with conventional suspension apparatus or to replace or supplement such apparatus, all or in part.

The invention, together with further objects, features, and advantages thereof, will be understood from the following detailed specification and claims, taken in connection with the appended drawings in which:

Figure 1:
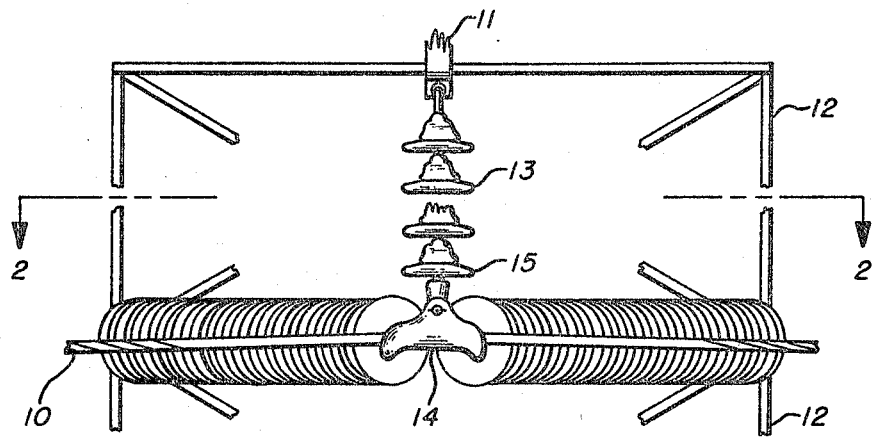
FIG. 1 illustrates one embodiment of the invention and shows a tower and suspension apparatus for a transmission line conductor in front elevation view.
Figure 2:
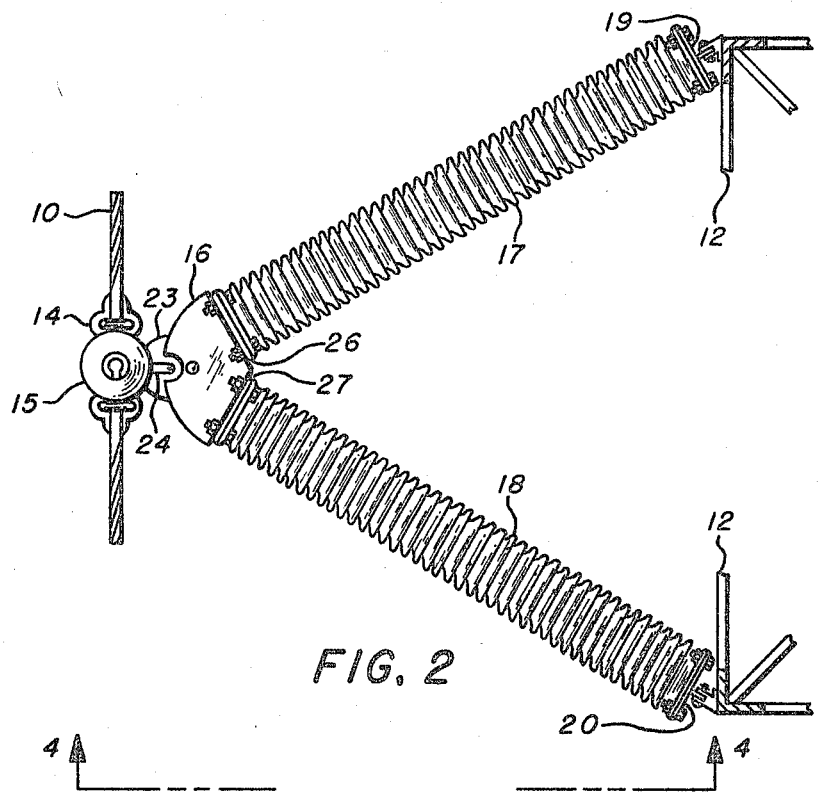
FIG. 2 is a top plan view of the apparatus of FIG. 1, taken in the direction 2—2 in FIG. 1.

Referring now to FIG. 1, the transmission line apparatus of the invention comprises a conductor cable 10 which is suspended from an arm 11 of a tower 12 by a string of suspension insulators 13 connected between the arm 11 and a conductor clamp 14 which carries the cable 10. The cable 10 is part of a multiple conductor system comprising the transmission line, the remaining conductors being carried from cross arms similar to the arm 11 in laterally and/or vertically spaced relation to the cable 10.

The string of suspension insulators 13 is constituted by a plurality of suspension insulators 15, of known design, having interconnecting ball-socket or clevis-tongue connectors. The conductor clamp 14 may be conveniently constituted as a suspension clamp as shown, as a trunnion clamp, elastic grips, or other conductor holding means.

The conductor cable 10 is subject to transverse vibrations as a result of excitation by wind, ice unloading, or other natural or artificially produced forces. Such vibrations occur at certain natural frequencies and may, under proper conditions, be imparted to the body of the cable as movements of the cable in the longitudinal direction thereof. Accordingly, the suspension clamp 14 and the insulators at the lower extremity of the string of insulators 13 undergo longitudinally oscillating movement with respect to the support structure.

In accordance with the present invention, a reference member or platform 16 is supported adjacent the cable 10 and the clamp 14 by two strut insulators 17 and 18 attached to the tower 12 horizontally away from the cable 10. The insulators 17 and 18 are attached to two support members 19 and 20 and which are fixed to the tower at vertically spaced points by means of spaced brackets 21 and 22 on the member 20 so that the insulators 17 and 18 are maintained in a substantially horizontal position.

The rigid characteristic of the insulators 17 and 18, with the divergent arrangement of those insulators in the horizontal plane and fixed support in the vertical direction, determines the position of the member 16 adjacent the conductor clamp 14. The member 16 provides a fixed support for a rotary damper 23 which is connected to the conductor clamp 14 for actuation of the damper by relative movement of the parts in the horizontal direction.

The damper 23 is carried on the member 16 and has the operating lever arm 24 thereof pivotally connected to the clamp 14 by means of a clevis and pin 25. Accordingly, longitudinal movement of the cable 10 results in turning movement of the lever arm 24 relative to the housing of the damper and dissipation of the energy of oscillation by reason of the resistance to movement imparted by the fluid of the damper 23.

The reference member 16 comprises a body formed from flat steel plate and has flange members 26 and 27 welded to divergent edges thereof. The damper 23 has the housing part connected to the plate by means such as bolts 28 extending through openings in the parts. The member 16 and the support members 19 and 20 have the flange members thereof bolted to flanges at the ends of the insulator bodies which constitute the strut insulators 17 and 18, as is known in the art.

Figure 3:
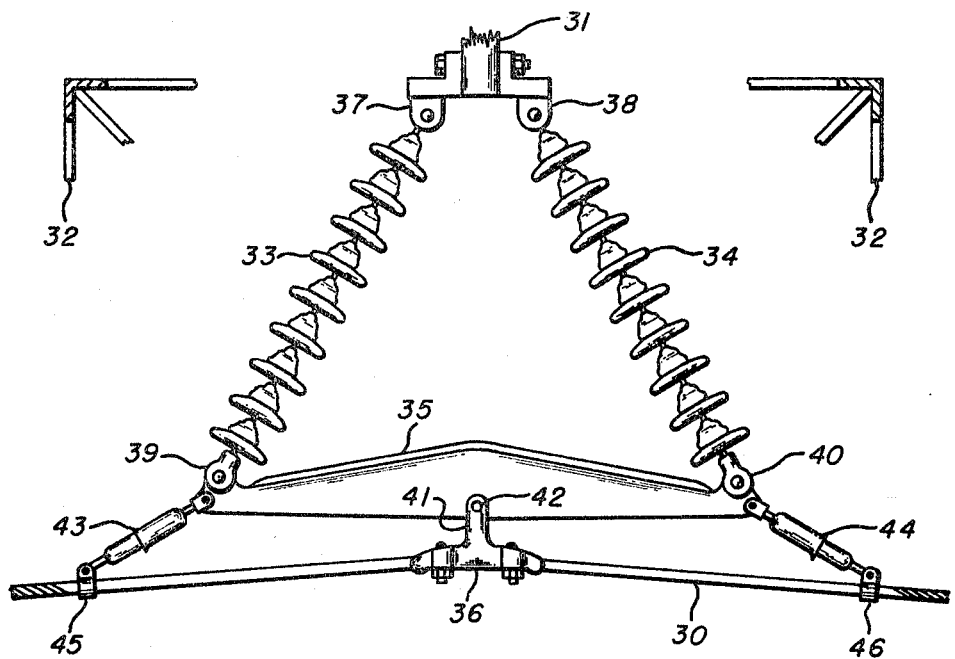
FIG. 3 illustrates another embodiment of the invention and shows a tower and suspension apparatus for a transmission line conductor in front elevation view.
Figure 4:
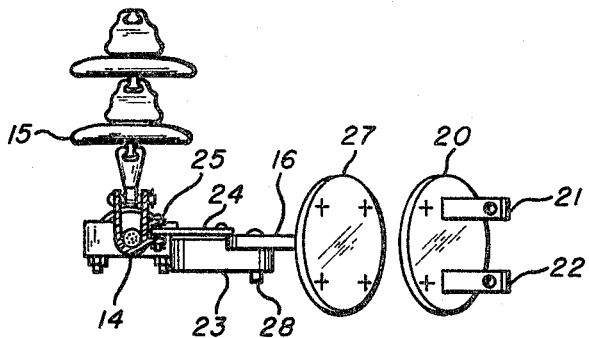
FIG. 4 is a partial side elevation view of the apparatus of FIG. 1 and FIG. 2, taken in the direction 4—4 in FIG. 2.

In the transmission line apparatus of FIG. 3, a conductor cable 30 is supported from an arm 31 of a tower 32 by means of two strings 33 and 34 of suspension insulators, a tie bar 35, and a conductor clamp 36. The two strings of suspension insulators 33 and 34 are connected to the cross arm 31 by means of clevis brackets 37 and 38 having the clevis parts thereof disposed in the longitudinal direction of the cable 30. The insulator strings 33 and 34 are pivotally connected to the tie bar 35 by means of ball clevises 39 and 40 and the tie bar 35 is connected to the clevis arms 41 of the conductor clamp 36 by a pin 42 at the center part of the bar. Accordingly, the assemblage comprising the insulator strings 33 and 34 and the tie bar 35 is free to execute limited oscillatory movements with longitudinal movement of the cable 30.

In accordance with the invention, the cable 30 is coupled to the tie bar 35 by two linear dampers 43 and 44, each connected between one of the extremities of the tie bar 35 and an adjacent portion of the cable outwardly from the tie bar. Two conductor clamps 45 and 46, comprising metal straps extending about the cable and compressively secured thereto, are utilized as fittings for attachment to and by the dampers 43 and 44. The dampers are pivotally connected to the cable clamps and to the tie bar by suitable clevis-pin fittings for relative pivotal movement of the respective members.

With the arrangement shown in FIG. 3, movement of the cable 30 in either longitudinal direction results in extension of one damper and retraction of the remaining damper. Accordingly, the resistance to the relative movement of the parts imparted by the dampers results in a substantial dissipation of the energy of oscillatory movement and suppresses or prevents such movements. It is important, of course, that the dynamic response characteristics of the suspension system be such that the oscillating movements of the conductor cable result in accompanying movements of the tie bar 35 and dampers 43 and 44.

The strut insulators each comprise a body of porcelain or other rigid insulating material having metal flanges at the extremities thereof for attachment to the flanges of the cooperating parts 16, 21, and 22. The strut insulators may be unitary or composite within the spirit of the invention.

The dampers 23, 43, and 44 are known dampers having relatively moving elements, a fluid medium, and some means for restricting the flow of the medium in one or both directions of relative movement of the elements. The rotary damper 23 preferably utilizes a liquid medium, and the linear dampers 43 and 44 may utilize a liquid or a gaseous medium between telescoping parts. Telescopic damping devices are known and various designs are shown, for example, in United States Patent 3,070,191, issued Dec. 25, 1962, and in the references cited therein. Rotary damping devices are known and arrangements analogous to linear dampers will be evident to those skilled in the art.

The invention is useful in connection with bundle conductor systems, and various arrangements for connecting the dampers to the suspension plates of such systems may be utilized.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. In apparatus for an electric power transmission system in which there is a tower, conductor means suspended from the said tower comprising a conductor cable and a conductor clamp holding the cable, and suspension insulators connected to the conductor clamp and to the tower, the conductor means being free to move relative to the tower at least in the longitudinal direction of the conductor cable, the combination, with the conductor means and suspension insulators, which comprises a reference member adjacent the cable, two strut insulators connected between the reference member and the tower with the strut insulators connected to the tower at points spaced in the longitudinal direction of the cable and fixing the position of the reference member in the longitudinal and transverse directions of the cable, and fluid damper means connected between the conductor means and the reference member for suppressing movement of the conductor cable in the longitudinal direction thereof.

2. Apparatus in accordance with claim 1, in which the damper means comprises a rotary hydraulic damper supported by the reference member and pivotally connected to the conductor clamp.

3. Apparatus in accordance with claim 1, with means connecting each strut insulator to the tower and attached to the tower at vertically spaced points for support of the insulators in the vertical direction.

4. In apparatus for an electric power transmission system in which there is a tower, conductor means suspended from the tower comprising a conductor cable suspended from the tower and a conductor clamp holding the cable, the combination with the conductor means of a tie bar comprising an elongate rigid member disposed along the cable, means connecting the conductor clamp to the center of the tie bar, separate insulating means extending each from one end of the tie bar to the tower suspending the tie bar from the tower, the conductor means being free to move relative to the tower at least in the longitudinal direction of the conductor cable, and fluid damper means connected between an end of the tie bar and an adjacent portion of the conductor cable for suppressing movement of the cable in the longitudinal direction thereof relative to the tower.

5. Apparatus in accordance with claim 4, with two linear fluid dampers pivotally attached to the two ends of the tie bar and to the two portions of the conductor cable outwardly therefrom respectively.

6. In apparatus for an electric power transmission system in which there is a tower, conductor means comprising a conductor cable and means for holding the cable, and means connected to the holding means suspending the conductor means from the tower, the conductor means being free to move relative to the tower at least in the longitudinal direction of the conductor cable, the combination with the conductor means of two elongate insulator means connected at the one ends thereof to the tower and divergently arranged in both longitudinal directions of the cable from the tower, damper means connected to the said elongate insulator means, and means connecting the damper means and insulator means between the tower and the conductor cable for suppressing longitudinal movement of the cable relative to the tower.

7. Electric power transmission apparatus in accordance with claim 6, in which the two insulator means are disposed generally in a horizontal plane and extend divergently from the cable to the tower, means fixing the ends of the respective insulator means to the tower at points spaced apart in the longitudinal direction of the cable, and means fixed to and supported by the insulating means at the ends thereof adjacent the cable, the last-named means having the fluid damper means fixed thereto and comprising a fixed reference member, whereby the damper means is actuated by movement of the cable relative to the reference member upon longitudinal movement of the cable relative to the tower.

8. Electric power transmission apparatus in accordance with claim 6, in which the two insulator means are disposed generally in a vertical plane through the cable along the length thereof, means connecting the two insulator means to the tower at the ends thereof remote from the cable, an elongate rigid member arranged in the plane of the cable and insulator means comprising a tie bar, and means connecting the two insulator means to the extremities of the tie bar, the two insulator means diverging apart from the tower to the tie bar, means pivotally connecting the cable-holding means to the center of the tie bar, the damper means being connected between the conductor cable and the tie bar adjacent an extremity thereof, whereby the damper means is actuated by relative movement of the tie bar and cable upon longitudinal movement of the cable relative to the tower.

References Cited by the Examiner

UNITED STATES PATENTS

| | | | |
|---|---|---|---|
| 1,160,544 | 11/1915 | Steinberger | 174—148 X |
| 2,587,587 | 3/1952 | Bellezza et al. | 174—158 X |

FOREIGN PATENTS

| | | |
|---|---|---|
| 684,740 | 12/1939 | Germany. |
| 341,340 | 6/1936 | Italy. |

OTHER REFERENCES

German printed application 1,099,026, February 1961.

LARAMIE E. ASKIN, *Primary Examiner.*

JOHN F. BURNS, *Examiner.*

J. F. RUGGIERO, *Assistant Examiner.*